United States Patent
Smole

(10) Patent No.: US 11,128,869 B1
(45) Date of Patent: Sep. 21, 2021

(54) VIDEO ENCODING BASED ON CUSTOMIZED BITRATE TABLE

(71) Applicant: Bitmovin, Inc., San Francisco, CA (US)

(72) Inventor: Martin Smole, Klagenfurt (AT)

(73) Assignee: Bitmovin, Inc., San Francisco, CA (US)

( * ) Notice: Subject to any disclaimer, the term of this patent is extended or adjusted under 35 U.S.C. 154(b) by 81 days.

(21) Appl. No.: 16/167,464

(22) Filed: Oct. 22, 2018

(51) Int. Cl.
*H04N 19/146* (2014.01)
*H04N 19/132* (2014.01)
*H04N 19/31* (2014.01)
*H04N 21/234* (2011.01)
*H04L 29/06* (2006.01)

(52) U.S. Cl.
CPC ......... *H04N 19/146* (2014.11); *H04N 19/132* (2014.11); *H04N 19/31* (2014.11); *H04N 21/234* (2013.01); *H04L 65/80* (2013.01)

(58) Field of Classification Search
None
See application file for complete search history.

(56) References Cited

U.S. PATENT DOCUMENTS

| | | | | |
|---|---|---|---|---|
| 6,704,281 B1* | 3/2004 | Hourunranta | ............ | H04N 7/52 370/230 |
| 8,743,954 B1* | 6/2014 | Masterson | ........... | H04N 19/154 375/240.05 |
| 8,767,825 B1* | 7/2014 | Wang | .................. | H04N 19/172 375/240.1 |
| 9,124,642 B2* | 9/2015 | Choudhury | ........... | H04L 65/602 |
| 9,615,098 B1* | 4/2017 | Yi | ......................... | H04N 19/179 |
| 10,419,773 B1* | 9/2019 | Wei | ...................... | H04N 19/169 |
| 2003/0202580 A1* | 10/2003 | Noh | ..................... | H04N 19/107 375/240.03 |

(Continued)

FOREIGN PATENT DOCUMENTS

WO   WO 2016/160295 A1   10/2016

OTHER PUBLICATIONS

A. Asan, I. Mkwawa, L. Sun, W. Robitza and A. C. Begen, "Optimum Encoding Approaches on Video Resolution Changes: A Comparative Study," 2018 25th IEEE International Conference on Image Processing (ICIP), Athens, Greece, 2018, pp. 1003-1007, doi: 10.1109/ICIP.2018.8451635. (Year: 2018).*

(Continued)

*Primary Examiner* — Stefan Gadomski
(74) *Attorney, Agent, or Firm* — Marton Ribera Schumann & Chang LLP; Chien-Ju Alice Chuang; Hector J. Ribera

(57) ABSTRACT

An original input content is subjected to multiple constant quality probe encodes for a defined set of resolutions. In one embodiment, probe encodes encode a few parts of the original source video, for example, 30 seconds from 5 different positions. Each probe encode delivers an average bitrate that is required to achieve the configured constant quality. The mean value of the average bitrate is taken per resolution. This results in a list of bitrates that map to a resolution that would achieve the best quality, a custom bitrate table. Based on the custom bitrate table, an optimized bitrate ladder is computed. The process starts with a configurable minimum bitrate and steps up by a bitrate step size that is between a configurable min and max bitrate step size until the bitrate of the highest resolution is reached.

14 Claims, 4 Drawing Sheets

(56) References Cited

U.S. PATENT DOCUMENTS

| | | | | |
|---|---|---|---|---|
| 2003/0206558 | A1* | 11/2003 | Parkkinen | G10L 19/002 370/477 |
| 2005/0015246 | A1* | 1/2005 | Thumpudi | G10L 19/24 704/229 |
| 2009/0310673 | A1* | 12/2009 | Chung | H04N 19/147 375/240.03 |
| 2012/0147958 | A1* | 6/2012 | Ronca | H04N 19/14 375/240.16 |
| 2014/0169662 | A1* | 6/2014 | Liu | H04N 19/40 382/155 |
| 2014/0185466 | A1* | 7/2014 | Syed | H04N 21/8451 370/252 |
| 2014/0348246 | A1* | 11/2014 | Fu | H04N 19/115 375/240.26 |
| 2015/0205500 | A1* | 7/2015 | Zacharias | G06F 9/451 715/763 |
| 2015/0237346 | A1* | 8/2015 | Symes | H04N 19/124 375/240.03 |
| 2015/0277721 | A1* | 10/2015 | Drewes | G06F 3/04847 715/716 |
| 2015/0288965 | A1* | 10/2015 | Li | H04N 19/124 375/240.03 |
| 2016/0014418 | A1* | 1/2016 | Shao | H04N 19/115 375/240.02 |
| 2016/0021380 | A1* | 1/2016 | Li | H04N 19/86 375/240.26 |
| 2016/0044080 | A1* | 2/2016 | DuBreuil | H04L 65/602 709/219 |
| 2016/0073106 | A1* | 3/2016 | Su | H04N 21/234363 375/240.02 |
| 2016/0088322 | A1* | 3/2016 | Horev | H04N 21/23418 725/14 |
| 2016/0100162 | A1* | 4/2016 | Reisner | H04N 19/156 375/240.02 |
| 2016/0295216 | A1* | 10/2016 | Aaron | H04N 21/23439 |
| 2016/0295250 | A1* | 10/2016 | Yang | H04N 21/23805 |
| 2017/0048536 | A1* | 2/2017 | Forehand | H04N 21/2404 |
| 2017/0070757 | A1* | 3/2017 | Phillips | H04N 21/6408 |
| 2017/0085872 | A1* | 3/2017 | Perron | H04N 21/2402 |
| 2017/0359582 | A1* | 12/2017 | Kawano | H04N 19/124 |
| 2018/0027266 | A1* | 1/2018 | Schmidt | H04N 21/236 725/116 |
| 2018/0027293 | A1* | 1/2018 | Yamamoto | G06F 13/00 725/86 |
| 2018/0035137 | A1* | 2/2018 | Chen | H04N 21/2743 |
| 2018/0109468 | A1* | 4/2018 | Sridhar | H04L 65/602 |
| 2018/0160161 | A1* | 6/2018 | Reznik | H04N 21/8456 |
| 2018/0167620 | A1* | 6/2018 | Li | H04N 17/004 |
| 2018/0176623 | A1* | 6/2018 | Nugent | H04N 21/6547 |
| 2018/0242015 | A1* | 8/2018 | Katsavounidis | H04N 21/23439 |
| 2018/0302456 | A1* | 10/2018 | Katsavounidis | H04L 65/605 |
| 2018/0309809 | A1* | 10/2018 | Sen | H04L 67/322 |
| 2018/0343458 | A1* | 11/2018 | Katsavounidis | H04N 19/177 |
| 2018/0365816 | A1* | 12/2018 | Park | G06T 5/50 |
| 2019/0028529 | A1* | 1/2019 | Katsavounidis | H04N 19/132 |
| 2019/0028745 | A1* | 1/2019 | Katsavounidis | H04N 21/23805 |
| 2019/0132591 | A1* | 5/2019 | Zhang | H04N 19/136 |
| 2019/0199772 | A1* | 6/2019 | Pennarun | H04L 65/80 |
| 2020/0007884 | A1* | 1/2020 | Mrak | H04N 19/156 |
| 2020/0029131 | A1* | 1/2020 | Mavlankar | H04N 21/8455 |
| 2020/0067852 | A1* | 2/2020 | Sen | H04N 19/00 |

OTHER PUBLICATIONS

J. De Cock, Z. Li, M. Manohara and A. Aaron, "Complexity-based consistent-quality encoding in the cloud," 2016 IEEE International Conference on Image Processing (ICIP), Phoenix, AZ, USA, 2016, pp. 1484-1488, doi: 10.1109/ICIP.2016.7532605. (Year: 2016).*

Yuriy A. Reznik, Karl O. Lillevold, Abhijith Jagannath, Justin Greer, and Jon Corley. 2018. Optimal Design of Encoding Profiles for ABR Streaming. In Proceedings of the 23rd Packet Video Workshop (PV'18). Association for Computing Machinery, New York, NY, USA, 43-47. (Year: 2018).*

Anne Aaron, Zhi Li, Megha Manohara, Jan De Cock and David Ronca, Netflix, Inc. "Per-Title Encode Optimization" Dec. 14, 2015 (retreived from https://medium.com/netflix-techblog/per-title-encode-optimization-7e994421362a2 on Aug. 13, 2018).

\* cited by examiner

VIDEO ENCODING BASED ON CUSTOMIZED BITRATE TABLE

BACKGROUND

This disclosure generally relates to encoding of video or other media, and more particularly to the encoding of video titles using a customized approach.

Due to the increasing availability of mobile high speed Internet connections like WLAN/3G/4G/5G and the huge smartphone and tablet device boom in the recent years, mobile video streaming has become an important aspect of modern life. Online video portals like YouTube or Netflix deploy progressive download or adaptive video on demand systems and count millions of users watching their content every day. Real-time entertainment produces already nearly 50% of the U.S. peak traffic nowadays. Particularly for mobile environments, adaptive streaming is required to cope with the considerable high bandwidth fluctuations. The video stream has to adapt to the varying bandwidth capabilities in order to deliver the user a continuous video stream without stalls at the best possible quality for the moment, which is achieved, for example, by dynamic adaptive streaming over HTTP.

In this context, adaptive streaming technologies, such as the ISO/IEC MPEG standard Dynamic Adaptive Streaming over HTTP (DASH), Microsoft's Smooth Streaming, Adobe's HTTP Dynamic Streaming, and Apple Inc.'s HTTP Live Streaming, have received a lot of attention in the past few years. These streaming technologies require the generation of content of multiple encoding bitrates and varying quality to enable the dynamic switching between different version of a title with different bandwidth requirements to adapt to changing conditions in the network. Hence, it is important to provide easy content generation tools to developers to enable the user to encode and multiplex content in segmented and continuous file structures of differing qualities with the associated manifest files.

Existing encoder approaches allow users to quickly and efficiently generate content at multiple quality levels suitable for adapting streaming approaches. For example, a content generation tool for DASH video on demand content has been developed by Bitmovin, Inc. (San Francisco, Calif.), and it allows users to generate content for a given video title without the need to encode and multiplex each quality level of the final DASH content separately. The encoder generates the desired representations (quality/bitrate levels), such as in fragmented MP4 files, and MPD file, based on a given configuration, such as for example via a RESTful API. Given the set of parameters the user has a wide range of possibilities for the content generation, including the variation of the segment size, bitrate, resolution, encoding settings, URL, etc. Using batch processing, multiple encodings can be automatically performed to produce a final DASH source fully automatically.

To accomplish these multiple representations of a given title, conventional encoders employ a bitrate ladder that attempts to optimize the quality of the resulting encoded video for each of several target resolutions. Each step of the ladder maps a bitrate to a resolution. An encoder uses the bitrate ladder to generate the various versions of the video title at each of the target resolutions using the defined bitrate. The mapping of bitrates and resolutions in a bitrate ladder provides a tradeoff between quality, efficiency, and costs. Given a defined set of resolutions, e.g., low, medium, and high, the best possible bitrate ladder can be found by encoding the input file with a different set of bitrates for each resolution and performing a quality analysis for each of the results. However, this would require several encodings (e.g. 5 encodings with a different bitrate per rendition, and 5 renditions=25 encodings to determine the final bitrate ladder). It isn't guaranteed that those encodings are sufficient to determine a bitrate ladder, because before performing the encoding and measuring the quality it is unknown whether the range of bitrate used will be sufficient to determine the quality behavior of a given resolution. Thus, determining the ideal bitrate ladder is very computationally expensive and increases the time it takes to determine the bitrate ladder and to perform the subsequent encoding.

In the past, bitrate ladders developed empirically for "average" content and could be used to encode any number of different videos using the same bitrate ladder. However, for videos that were significantly different from the "average content" the quality of the output was deficient. To address this problem, bitrate ladders were developed for different content types, such as action movies, sports, animations, etc. such that a different bitrate ladder would be used by the encoder depending on the type of video to be encoded. However, these genere-based bitrate ladders still failed to provide the optimal encoding tradeoffs for diverse video types. For example, for publishers with diverse and large content libraries, automated encoding tools provide an efficient approach to encoding their content but given the bredth of the content types, the resulting encoded videos were not optimal.

Other prior approaches used more customized bitrate ladders to provide "per-title encoding" using different bitrate ladders for titles of varying complexity. For example, WO 2016/160295, titled "Techniques for optimizing bitrates and resolutions during encoding," provides "an encoding bitrate ladder selector tailors bitrate ladders to the complexity of source data." In this approach, a particular content is analyzed and assigned to a "complexity bucket" with a corresponding bitrate ladder customized for content of that average complexity. However, the bitrate ladders selectable using this approach are not optimal for each title.

Thus, what is needed is an efficient encoding approach that provides an optimized encoding bitrate/resolution mapping for a given title without significantly impacting the encoding performance.

SUMMARY

According to embodiments of the disclosure, a computer-implemented method for generating a custom bitrate ladder for encoding an input video comprises probe encoding the input video to generate a bitrate table, the bitrate table mapping each of a plurality of target resolutions to a mean bitrate, the mean bitrate computed from average bitrates resulting from probe encoding a plurality of samples of the input video to achieve a constant quality. The method also comprises determining a plurality of optimal resolutions for each of a set of target bitrates, the target bitrates based on a configurable bitrate step size, each of the plurality of optimal resolutions determined based on a comparison of each target bitrate with two mean bitrates in the bitrate table and selecting the resolution corresponding to the mean bitrate in the bitrate table with a smallest distance score. The method includes generating a custom bitrate ladder for the input video mapping each optimal resolution to each corresponding target bitrate.

According to alternative embodiments, a computer-implemented method for encoding an input video in a plurality of bitrates corresponding to a plurality of resolutions comprises determining a mean bitrate for each of a plurality of first set of target resolutions, each mean bitrate based on a plurality of average bitrates resulting from encoding a plurality of segments of the input video to achive a constant quality at each of the resolutions of the first set of target resolutions. In one embodiment, the method also includes determining a first optimal resolution for a first bitrate of the plurality of bitrates, the first optimal resolution corresponding to the target resolution for the mean bitrate with a lowest of a first and a second distance scores to the first bitrate, the first distance score corresponding to the distance score between the first bitrate and a lower of two of the mean bitrates numerically closest to the first bitrate, the second distance score corresponding to the distance score between the first bitrate and a higher of the two of the mean bitrates numerically closest to the first bitrate. The method further includes determining a second bitrate based on a bitrate step size between a minimum bitrate step size and a maximum bitrate step size applied to the first bitrate.

In addition, in this embodiment, the method also includes determining a second optimal resolution for the second bitrate, the second optimal resolution corresponding to the target resolution for the mean bitrate with a lowest of a third and a fourth distance scores to the second bitrate, the third distance score corresponding to the distance score between the second bitrate and a lower of two of the mean bitrates numerically closest to the second bitrate, the fourth distance score corresponding to the distance score between the second bitrate and a higher of the two of the mean bitrates numerically closest to the second bitrate. The method also includes generating a custom bitrate ladder for the input video based, at least in part, on the first optimal resolution corresponding to the first bitrate and the second optimal resolution corresponding to the second bitrate.

According to different embodiments, the plurality of samples consist of less than 10 samples of less than 30 seconds each. While according to other embodiments, the plurality of samples consist of less than 6 samples of less than 30 seconds each.

In some embodiments the methods also comprise encoding the input video into output files at each of the plurality of optimal resolutions using the custom bitrate ladder. The encoding may correspond to one or more encoding formats from the group consisting of MPEG-DASH, Smooth Streaming, HTTP Dynamic Streaming, and HTTP Live Streaming encoding formats. The encoding may further be based on any video codec type, such as H.264/AVC, H.265/HEVC, VP8, VP9, and AV1.

According to some embodiments, a first distance score may be computed as the difference between the target bitrate and a smaller of the two mean bitrates. A second distance score may be computed based on the target bitrate and the larger of the two mean bitrates. The distance values can be empirically determined to provide the smallest distance to the mean bitrate corresponding to the best resolution. For example, formulas or variables based on tunable values and parameters can be designed by running a large amount of tests and tuning the algorithm. In some embodiments, the distance formulas and values are adopted specifically for a given title, e.g., using machine learning to obtain the values based on some characteristics of the source file. For example, in embodiments, the second distance score is computed according to the equation: Higher Resolution Score=$K*w^{a}*e^{(b*bitrate)}$. In one embodiment K is 800, a is 0.55 and b is 0.0003/1000.0.

According to another aspect of various embodiments, the target resolutions may include resolutions with a pixel width of 384, 512, 640, 768, 1024, 1280, 1600, 1920, 2560, or 3840 pixels. In some embodiments, the target resolutions may be user configurable.

The figures depict various example embodiments of the present disclosure for purposes of illustration only. One of ordinary skill in the art will readily recognize from the following discussion that other example embodiments based on alternative structures and methods may be implemented without departing from the principles of this disclosure and which are encompassed within the scope of this disclosure.

DESCRIPTION OF EMBODIMENTS OF THE INVENTION

The following description describe certain embodiments by way of illustration only. One of ordinary skill in the art will readily recognize from the following description that alternative embodiments of the structures and methods illustrated herein may be employed without departing from the principles described herein. Reference will now be made in detail to several embodiments.

The above and other needs are met by the disclosed methods, a non-transitory computer-readable storage medium storing executable code, and systems for encoding video content.

To address the problem identified above, in one embodiment, the original input content is probe encoded to evaluate its characteristics, and an optimized bitrate table for encoding the selected content is generated. The original input content is subjected to multiple constant quality probe encodes for a defined set of resolutions. In one embodiment, probe encodes encode a few parts of the original source video, for example, 30 seconds from 5 different positions. Each probe encode delivers an average bitrate that is required to achieve the configured constant quality. The mean value of the average bitrate is taken per resolution. This results in a list of bitrates that map to a resolution that would achieve the best quality, a custom bitrate table. Based on the custom bitrate table, an optimized bitrate ladder is computed. The process starts with a configurable minimum bitrate and steps up by a bitrate step size that is between a configurable min and max bitrate step size until the bitrate of the highest resolution is reached.

Figure 1:
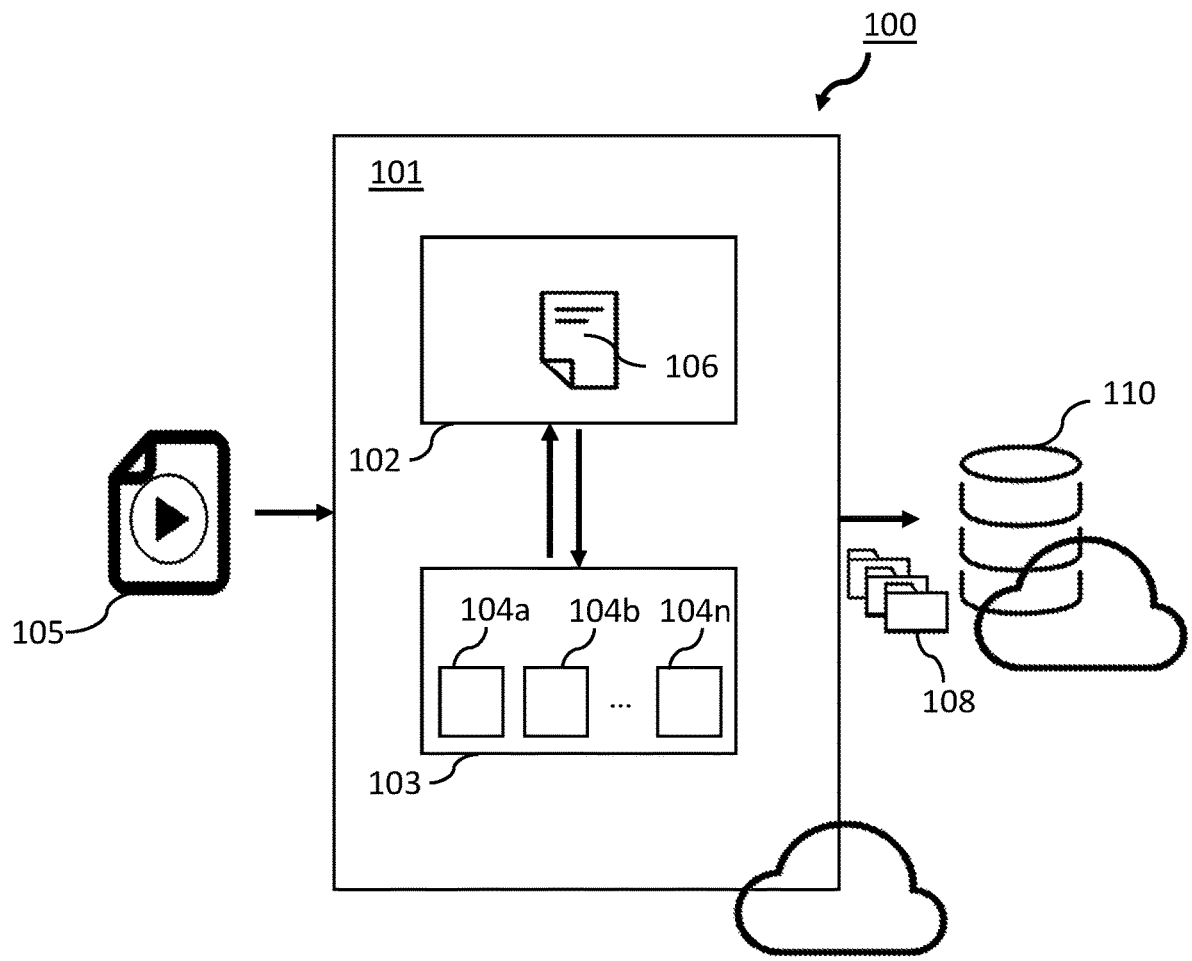
FIG. 1 is an illustrative diagram of an encoding system according to one embodiment.

Now referring to FIG. 1, an content encoding system is illustrated according to embodiments of the invention. In one embodiment, the encoding system 100 is a cloud-based encoding system available via computer networks, such as the Internet, a virtual private network, or the like. The encoding system 100 and any of its components may be hosted by a third party or kept within the premises of an encoding enterprise, such as a publisher, video streaming service, or the like. The encoding system 100 may be a distributed system but may also be implemented in a single server system, multi-core server system, virtual server system, multi-blade system, data center, or the like. The encoding system 100 and its components may be implemented in hardware and software in any desired combination within the scope of the various embodiments described herein.

According to one embodiment, the encoding system 100 includes an encoder server 101. The encoder server 101 includes a bitrate ladder generation module 102 and an encoder module 103 as two of its components. The encoding module 103 may include any number of encoding submodules 104a, 104b, . . . , 104n, each capable of encoding an input video into a specific encoding format. For example, encoding submodule 104a may be an MPEG-DASH encoding submodule for encoding an input video 105 into a set of encoded media 108 according to the ISO/IEC MPEG standard for Dynamic Adaptive Streaming over HTTP (DASH). Other encoding submodules 104b-104n may provide encoding of video for other formats, including without limitation Microsoft's Smooth Streaming, Adobe's HTTP Dynamic Streaming, and Apple Inc.'s HTTP Live Streaming. In addition, encoding submodules 104b-104n may use any type of codec for video encoding, including, for example, H.264/AVC, H.265/HEVC, VP8, VP9, AV1, and others. Any encoding standard or protocol may be supported by the encoder module 103 by providing a suitable encoding submodule with the software and/or hardware required to implement the desired encoding.

According to one aspect of embodiments of the invention, the encoder module 103 encodes an input video 105 at multiple bitrates with varying resolutions into a resulting encoded media 108. For example, in one embodiment, the encoded media 108 includes a set of fragmented MP4 files encoded according to the H.264 video encoding standard and a media presentation description ("MPD") file according to the MPEG-DASH specification. In an alternative embodiment, the encoding module 103 encodes a single input video into multiple sets of encoded media 108 according to multiple encoding formats, such as MPEG-DASH and HLS for example. The encoder 103 is capable of generating output encoded in any number of formats as supported by its subencoding modules 104a-n.

According to another aspect of various embodiments, the encoder module 103 encodes the input video based on a given input configuration 106. The input configuration 106 can be received into the encoding server 101, via files, command line parameters provided by a user, via API calls, HTML commands, or the like. The input configuration 106 includes parameters for controlling the content generation, including the variation of the segment sizes, bitrates, resolutions, encoding settings, URL, etc. For example, according to one embodiment, the input configuration 106 includes a set of target resolutions desired for encoding a particular input video 105. In one embodiment, the target resolutions are provided as the pixel width desired for each output video and the height is determined automatically by keeping the same aspect ratio as the source. For example, the following pixel-width resolutions may be provided 384, 512, 640, 768, 1024, 1280, 1600, 1920, 2560, 3840. In this embodiment, the encoded output 108 includes one or more sets of corresponding videos encoding in one or more encoding formats for each specified resolution, namely, 384, 512, 640, 768, 1024, 1280, 1600, 1920, 2560, and 3840. In one embodiment, a set of fragmented MP4 files for each resolution is included in the encoded output 108. According to yet another aspect of various embodiments, the input configuration 106 is customized for the input video 105 to provide an optimal bitrate for each target resolution. The optimal bitrates may be provided in one embodiment as a customized bitrate ladder as further described herein. The customized input configuration 106 is used to control the encoding processes in encoder module 103.

According to another aspect of various embodiments, the encoded output 108 is then delivered to storage 110. For example, in one embodiment, storage 110 includes a content delivery network ("CDN") for making the encoded content 108 available via a network, such as the Internet. The delivery process may include a publication or release procedure, for example, allowing a publisher to check quality of the encoded content 108 before making available to the public. In another embodiment, the encoded output 108 may be delivered to storage 110 and be immediately available for streaming or download, for example, via a website.

Figure 2:
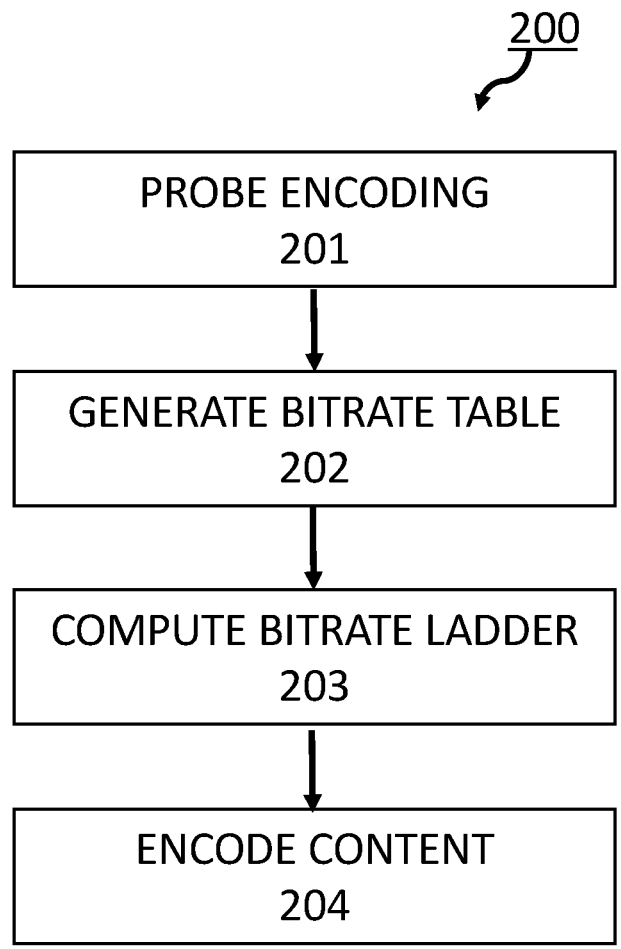
FIG. 2 is a flow chart illustrative of a method for encoding video content according to one embodiment.

Now referring to FIG. 2, an encoding process is provided according to various embodiments. According to one embodiment, the encoding process 200 performs a probe encoding 201 of the original input content. The probe encoding 201 is a fast an efficient way to determine average bitrates for encoding the input video at a set of target resolutions. With the probe encoding process, an average bitrate table is generated 202 that is specific to the current input video. For example, action movies with rapidly changing, fast-moving, scenes will result in a higher average bitrate than a cartoon or a slower pace film with long segments from the same camera angle of a mostly stationary scene. Moreover, because the bitrate table is generated from the actual input content to be encoded, the average bitrates determined are more representative of the specific input video. Based on the generated bitrate table, a custom bitrate ladder is computed 203 mapping a set of target resolutions defined in the input parameters to corresponding bitrates for encoding the input content. Instead of "genre-based" bitrate ladders or complexity-based bitrate ladders, the encoding process according to embodiments of the invention provides a fully custom bitrate ladder for each input video to be encoded. Once the custom bitrate ladder is computed 203, the input content is encoded 204 in each of the desired target resolutions with the corresponding bitrate specified in the bitrate ladder. The encoding process 204 is repeated for each target resolution to generate a corresponding encoded output video. In addition, in different embodiments, the encoding may be repeated for different encoding formats as, for example, specified by the input configuration.

According to another embodiment, a "live streaming" encoding process is provided. In this embodiment, the content encoding 204 begins with a generic bitrate ladder provided as a default. As the live streaming input is processed, when a minimum threshold of content has been streamed, the bitrate ladder is optimized based on the average bitrates resulting from the encoding of the content streamed up to that point. The average bitrates are computed and to generate a bitrate table 202 that is used to compute the bitrates for the target resolutions and to modify the generic bitrate table with the customized values. This process is performed "off-line" while streaming of the live content continues and when completed, the bitrate ladder can be updated for subsequent encoding. According to embodiments, the process may be repeated every pre-set time period to adjust for average bitrate variations due to changes in the live content.

Figure 3:
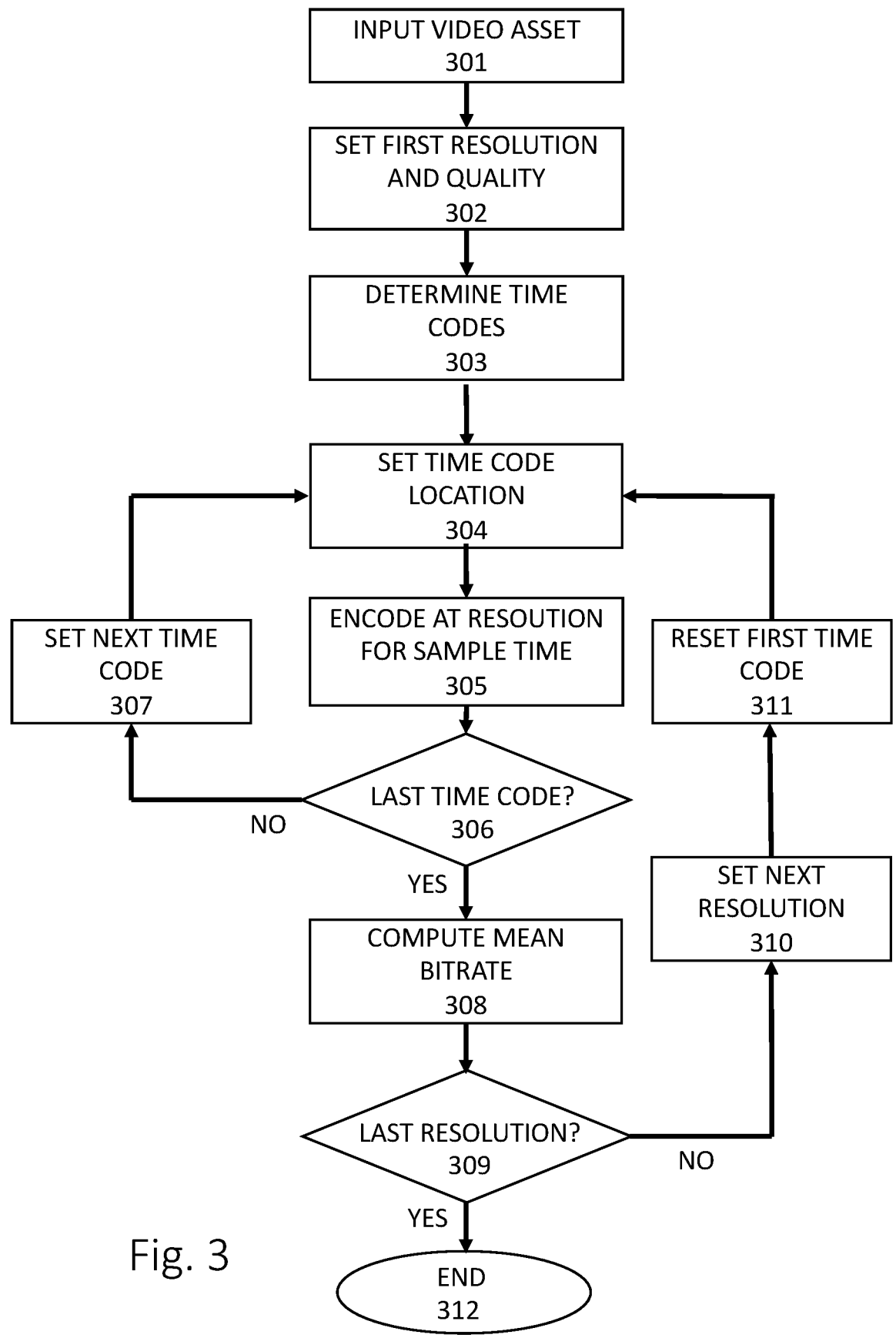
FIG. 3 is a flow chart illustrative of a method for probe encoding a video input according to one embodiment.

Now referring to FIG. 3, a probe encoding process is provided according to embodiments of the disclosure. A video asset in input 301 and a target constant quality and first resolution of a set of target resolutions is set 302. The desired video quality is maintained for all resolutions during the probe encode process. Any number of resolutions may be specified. For example, given a set of pixel-width resolutions including 384, 512, 640, 768, 1024, 1280, 1600, 1920, 2560, 3840 provided as input configuration parameters, the first resolution 384 is set. The pixel height is automatically determined from the input video to maintain the same aspect ratio. For example, for a 4:3 display aspect ratio, the pixel height for the 384 resolution would be 288 pixels. Similarly, for a 3840 resolution, a typical "4K Ultra HD" content would have an aspect ration of 16:9 and a corresponding pixel height of 2160 pixels. The following table provides some typical resolutions with corresponding pixels and aspect ratios:

TABLE 1

| Resolution | Pixel Width | Pixel Height | Aspect Ratio |
| --- | --- | --- | --- |
| — | 384 | 288 | 4:3 |
| — | 512 | 384 | 4:3 |
| VGA | 640 | 480 | 4:3 |
| Wide VGA | 768 | 480 | 8:5 |
| PAL | 1024 | 576 | 16:9 |
| HDTV 720p | 1280 | 720 | 16:9 |
| HD+ | 1600 | 900 | 16:9 |
| Full HD (1080p) | 1920 | 1080 | 16:9 |
| Quad HD (QHD) | 2560 | 1440 | 16:9 |
| 4K Ultra HD | 3840 | 2160 | 16:9 |

The encoding process is not limited to the resolutions in Table 1, which are provided for illustrative purposes only. Further, for any given pixel-width, different pixel heights may result depending on the aspect ratio of the original video input.

According to one embodiment, a set of time codes in the input video is determined 303. In one embodiment, the time codes are determined based on configurable parameters, for example via input files, user input, or the like. In an alternative embodiment, the time codes are based on pre-configured parameters. For example, a number of time codes is one such parameter which may be preconfigured or may be part of the input configuration for the encoding process. In one embodiment, the number of time codes may be set based on the length of the input video. For example, three time codes per hour of input video may be set. In a standard, 90 minute video, 5 time codes may be used. The number of time codes may be fully configurable in different embodiments. As the number of time codes increases, the performance of the probe encoding will decrease, all other parameters being equal, therefore there is a tradeoff between increasing the number of time codes and the time it will take to perform the probe encoding process.

According to various embodiments, potentially configurable input parameters include the target resolutions, the number of different resolutions, the maximum and minimum resolutions, a desired target video quality, the sample time or length of each probe encode, the placement of the time codes, etc. In one embodiment, for a standard 90-minute input video, 10 resolutions are set, including 384, 512, 640, 768, 1024, 1280, 1600, 1920, 2560, and 3840. In addition, five time codes are provided equally spaced between the minute 5 and minute 55 of the video. Each probe encode sample time is set to 30 seconds. These parameters may be included in a input configuration file 106, as for example illustrated in FIG. 1. As the parameters are changed, the probe encode performance will vary. In some embodiments, the parameters may be preset for a simpler configuration process. In another embodiment, a user interface is provided, for example via a graphical user interface ("GUI"), command line interface, or the like, through which a user may set any of these parameters.

According to one embodiment, once the time codes are determined, the input video is accessed 304 at the location in the video input specified by the first time code. The video is then encoded 305 for the sample time specified. For example, 10 seconds, 20 seconds, 30 seconds, 1 minute, or the like. The longer the sample time, the longer it takes to perform the probe encode. In one embodiment, the probe encode process is done serially on each sample location and its duration is the sum of the sample encoding for each sample locations. In another embodiment, the probe encode process is done in parallel with a plurality of encoding nodes. In this embodiment, the duration of the probe encode can be reduced to the encoding time for the longest encode from the encodings of all the samples. The probe encode delivers an average bitrate that is required to achieve the configured constant quality. The process then checks 306 to see if the current time code is the last time code. In one embodiment, if the probe encodes are done serially, while the last time code is not reached, the time codes are increased and set 307 to the next time code. Then the process repeats (steps 304-306) to encode sample times for each time code.

In an alternative embodiment, if the probe encodes are done in parallel, at step 304 each of the encoding nodes sets the time code for an assigned location. At step 305, the parallel encodes for each of the assigned locations is performed. If more than one set of parallel encodes is needed, for example if the number of locations exceeds the number of available encoding nodes, at step 306 a check is performed to determine if the last time code sample has been processed. If not, the next time code is set 307, and steps 304-306 repeat in parallel processes for the next set of time codes. Alternatively, if the available set of encoding nodes is larger than the number of time codes, the parallel process will conclude at step 306, since all the time codes will have been processed in parallel, substantially at the same time.

The mean of the average bitrates for the encodings at the current resolution is computed 308 and recorded. Then the process checks 309 to see if the current resolution is the last resolution specified in the configuration parameters. If it is not the last resolution, the next specified resolution is set 310, the time code is reset 311 to the first time code and the probe encoding repeats (steps 304-309) for each time code in the input video at the set resolution. Once the last target resolution is reached, the recorded mean bitrates for each resolution make up a bitrate table and the probe encoding process ends 312.

Figure 4:
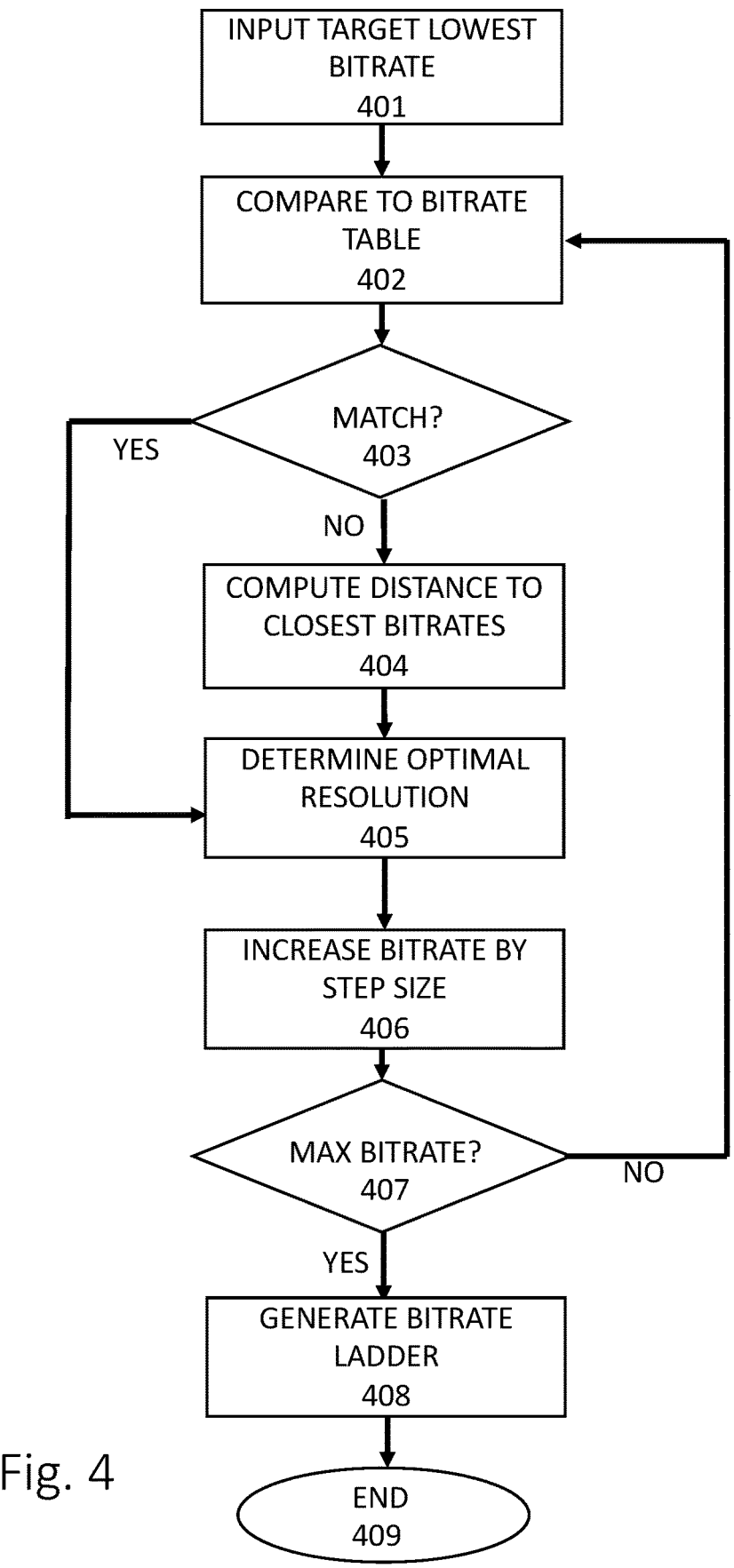
FIG. 4 is a flow chart illustrative of a method to generate a custom bitrate table according to one embodiment.

Now referring to FIG. 4, a custom bitrate ladder generation process is provided according to various embodiments. In one embodiment, an target lowest bitrate for encoding the input video is input 401. As described above, encoding configuration parameters may be provided in a number ways, including, for example, via files, APIs, user interfaces, or the like. The lowest target bitrate for a set of encoded video files is provided along with other configuration parameters. In addition, a custom bitrate table generated as for example described with reference to FIG. 3 is also provided. The lowest target bitrate is compared 402 with the custom bitrate table, which includes mean bitrates for a set of resolutions derived from a probe encoding process according to embodiments of the disclosure.

If the lowest target bitrate matches 403 one of the mean bitrates in the bitrate table, the process moves to step 405. However, more often, the lowest target bitrate will fall between two of the mean bitrates in the bitrate table. In that case, a distance score to each of those closests bitrates is computed 404. In one embodiment, the distance score to the lower bitrate is simply the target bitrate minus the median bitrate of the lower resolution from the custom bitrate table. The distance values can be empirically determined to provide the smallest distance to the mean bitrate corresponding to the best resolution. For example, formulas or variables based on tunable values and parameters can be designed by running a large amount of tests and tuning the algorithm. In some embodiments, the distance formulas and values are adopted specifically for a given title, e.g., using machine learning to obtain the values based on some characteristics of the source file. For example, in one embodiment, the distance score to the higher mean bitrate is computed according to a weithed product of factors defining the difference between resolution for the higher mean bitrate and the target bitragte. For example, in one embodiment the following equation may be used:

$$\text{Higher Resolution Score} = K * w^a * e^{(b*bitrate)} \qquad [\text{Eq. 1}]$$

For this distance score computation, w represents the width in pixels of the corresponding resolution for the higher mean bitrate and bitrate corresponds to the target bitrate. The constant K and the powers a and b may be adjusted to provide a distance value that optimizes the quality of the output. For example, in one embodiment, K is set to 800, b is set −0.55 and b is set to −0.00003/1000.0. In alternative embodiments different values that provide an optimal resolution for a given title may be used. Yet in other embodiments the values may be adapted over time based on machine learning that infers the value modifications from characteristics of the video files.

According to this embodiment, given the two distance scores, the optimal resolution is determined 405 based on the resolution corresponding to the mean bitrate in the bitrate table for the mean bitrate with the lowest distance score. In the case of a perfect match 403 between a mean bitrate in the bitrate table and the target bitrate, the optimal resolution is that of the matching mean bitrate in the bitrate table. The target bitrate is then increased 406 by a predefined step size to determine the next target bitrate for the bitrate ladder. The step size for the next bitrate is chosen based on a minimum and maximum bitrate step sizes. According to various embodiments, the maximum and minimum bitrate step sizes may be part of the configurable input parameters along with the target resolutions, the number of different resolutions, the maximum and minimum resolutions, a desired target video quality, the sample time or length of each probe encode, the placement of the time codes, etc. According to one embodiment, the bitrate step size is larger for lower bitrates and smaller for higher bitrates. For example, in one embodiment, the bitrate step size is determined as follows:

```
public double getBitrateStepSize (long startBitrate, long maxBitrate, long currentBitrate)
{
    long bitrateRange=maxBitrate−startBitrate;
    if (currentBitrate<((startBitrate+bitrateRange)/3))
        return this.maxBitrateStepSize;
    if (currentBitrate<((startBitrate+bitrateRange)*2/3))
        return (this.maxBitrateStepSize+this.minBitrateStepSize)/2;
    return this.minBitrateStepSize;
}
```

According to the above process, in one embodiment, three ranges of bitrates are defined for the target bitrate. Where the target bitrate is in the lower third of possible bitrates, bitrates between the lowest (startBitrate) and the highest (maxBitrate) possible target bitrates, as for example defined in the configuration parameters, the bitrate step size used is the maximum step defined in the configuration parameters. Where the target bitrate is in the middle third of possible bitrates, then the step size applied is the average of the maximum and minimum step sizes defined in the configuration parameters. Where the target bitrate is the top third of possible bitrates, then the step size applied is the minimum step size defined in the configuration parameters. In alternative embodiments different step sizes may be provided, for example by defining a different number bitrate ranges, such as 2, 5, or 6, with a corresponding different values of bitrate step sizes, preferably using larger step sizes for lower bitrate ranges. For example, in an embodiment with 2 bitrate ranges, the maximum step size is used for the bottom half and the minimum step size for the top half. In other embodiments, a linear formula may be used to calculate a target step size based on the bitrate or a logarithmic formula could be similarly be applied.

According to an aspect of one embodiment, the next target bitrate may be further adjusted depending on the maximum and minimum bitrates and step sizes provided as configuration parameters. For example, in one embodiment, the next target bitrate is provided as follows:

```
public long getNextBitrate (CrfEncodingResult crfEncodingResult, long startBitrate, long maxBitrate, long lastBitrate)
{
    long targetBitrate=(long) (lastBitrate*this.getBitrateStepSize(startBitrate, maxBitrate, lastBitrate));
    long minNextBitrate=(long) (lastBitrate*this.minBitrateStepSize);
    long maxNextBitrate=(long) (lastBitrate*this.maxBitrateStepSize);
    long smallestBitrateLargerThanMinStep this.findSmallestCrfBitrateLargerThanTarget(crfEncodingResult, minNextBitrate);
    long biggestBitrateSmallerThanMaxStep this.findBiggestCrfBitrateSmallerThanTarget(crfEncodingResult, maxNextBitrate);
    if (smallestBitrateLargerThanMinStep !=0)
    {
        smallestBitrateLargerThanMinStep=Math.min(smallestBitrateLargerThanMinStep, maxNextBitrate);
        smallestBitrateLargerThanMinStep=Math.max(smallestBitrateLargerThanMinStep, minNextBitrate);
    }
    if (biggestBitrateSmallerThanMaxStep !=0)
    {
        biggestBitrateSmallerThanMaxStep=Math.min(biggestBitrateSmallerThanMaxStep, maxNextBitrate);
        biggestBitrateSmallerThanMaxStep=Math.max(biggestBitrateSmallerThanMaxStep, minNextBitrate);
    }
    if (smallestBitrateLargerThanMinStep==0 && biggestBitrateSmallerThanMaxStep==0)
        return targetBitrate;
    if (smallestBitrateLargerThanMinStep==0)
        return biggestBitrateSmallerThanMaxStep;
    if (biggestBitrateSmallerThanMaxStep==0)
        return smallestBitrateLargerThanMinStep;
    if (smallestBitrateLargerThanMinStep==biggestBitrateSmallerThanMaxStep)
        return smallestBitrateLargerThanMinStep;
    if (Math.abs(targetBitrate−smallestBitrateLargerThanMinStep)<Math.abs(targetBitrate−biggestBitrateSmallerThanMaxStep))
        return smallestBitrateLargerThanMinStep;
    return biggestBitrateSmallerThanMaxStep;
}
```

As described above, in this embodiment, the next target bitrate is checked to make sure it does not exceed the maximum allowed bitrate when the step size is applied and instead a biggest bitrate smaller than the maximum step or a smallest bitrate larger than the minimum step size is provide as the next target bitrate according to the conditions noted above.

Referring back to FIG. 4, once the next target bitrate is determined 406 using the appropriate bitrate step size, the process checks 407 to see if the maximum allowed bitrate has been reached. As described above, the maximum and minimum bitrates are provided as configuration parameters, for example, in one embodiment, as an input configuration file along with all the other configuration parameters. If the maximum bitrate has not been reached, the process goes back to step 402 to compare the new target bitrate to the custom bitrate table. The process then repeats (steps 402-407) for each new target bitrate, determining the optimal resolution for each target bitrate, until the next target bitrate exceeds the maximum bitrate. At that point, the custom bitrate ladder with a mapping of each bitrate to the optimal resolution is complete and the process ends 409.

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a non-transitory computer-readable medium containing computer program code, which can be executed by a computer processor for performing any or all of the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Finally, the language used in the specification has been principally selected for readability and instructional purposes, and it may not have been selected to delineate or circumscribe the inventive subject matter. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights.

What is claimed is:

1. A computer-implemented method for generating a custom bitrate ladder for encoding an input video, the method comprising:
   probe encoding the input video to generate a bitrate table, the bitrate table mapping each of a plurality of target resolutions to a mean bitrate, the mean bitrate computed from average bitrates resulting from probe encoding a plurality of samples of the input video to achieve a constant quality;
   determining a plurality of optimal resolutions for each of a set of target bitrates, the target bitrates based on a configurable bitrate step size, each of the plurality of optimal resolutions determined based on a comparison of each target bitrate with two mean bitrates in the bitrate table and selecting the resolution corresponding to the mean bitrate in the bitrate table with a smallest distance score; and
   generating a custom bitrate ladder for the input video mapping each optimal resolution to each corresponding target bitrate,
   wherein the smallest distance score is based on a first and a second distance scores, the first distance score being computed as the difference between the target bitrate and a smaller of the two mean bitrates, the second distance score being computed based on the target bitrate and the larger of the two mean bitrates, one or both of the first and the second distance scores also being computed as a function of a pixel width of the resolution and a constant K.

2. The method of claim 1, wherein the plurality of samples consist of less than 10 samples of less than 30 seconds each.

3. The method of claim 1, wherein the plurality of samples consist of less than 6 samples of less than 30 seconds each.

4. The method of claim 1, further comprising encoding the input video into output files at each of the plurality of optimal resolutions using the custom bitrate ladder.

5. The method of claim 4, wherein the encoding corresponds to an encoding format from the group consisting of MPEG-DASH, Smooth Streaming, HTTP Dynamic Streaming, and HTTP Live Streaming encoding formats.

6. The method of claim 4, wherein the encoding is based at least in part on a codec selected from the group consisting of H.264/AVC, H.265/HEVC, VP8, VP9, and AV1.

7. The method of claim 1, wherein the second distance score is computed using the equation Higher Resolution Score=$K*w^{a}*e^{(b*bitrate)}$.

8. The method of claim 1, wherein the second distance score is computed using the equation Higher Resolution Score=$800*w^{-0.55}*e^{(-0.0003*bitrate/1000.0)}$.

9. The method of claim 1, wherein the target resolutions include resolutions with the pixel width of 384, 512, 640, 768, 1024, 1280, 1600, 1920, 2560, or 3840 pixels.

10. The method of claim 1, wherein the target resolutions are user configurable.

11. A non-transitory computer-readable storage medium including instructions that, when executed by a processing unit, cause the processing unit to generate a custom bitrate ladder for encoding an input video by performing the steps of:

probe encoding the input video to generate a bitrate table, the bitrate table mapping each of a plurality of target resolutions to a mean bitrate, the mean bitrate computed from average bitrates resulting from probe encoding a plurality of samples of the input video to achieve a constant quality;

determining a plurality of optimal resolutions for each of a set of target bitrates, the target bitrates based on a configurable bitrate step size, each of the plurality of optimal resolutions determined based on a comparison of each target bitrate with two mean bitrates in the bitrate table and selecting the resolution corresponding to the mean bitrate in the bitrate table with a smallest distance score; and generating a custom bitrate ladder for the input video mapping each optimal resolution to each corresponding target bitrate, wherein the smallest distance score is based on a first and a second distance scores, the first distance score being computed as the difference between the target bitrate and a smaller of the two mean bitrates, the second distance score being computed based on the target bitrate and the larger of the two mean bitrates, one or both of the first and the second distance scores also being computed as a function of a pixel width and a constant K.

12. The non-transitory computer-readable storage medium of claim 11, wherein the plurality of samples consist of less than 10 samples of less than 30 seconds each.

13. The non-transitory computer-readable storage medium of claim 11, further comprising instructions that, when executed by a processing unit, cause the processing unit to generate a custom bitrate ladder for encoding an input video by further performing the step of encoding the input video into output files at each of the plurality of optimal resolutions using the custom bitrate ladder.

14. The non-transitory computer-readable storage medium of claim 13, wherein the encoding corresponds to an encoding format from the group consisting of MPEG-DASH, AV1, HEVC, Smooth Streaming, HTTP Dynamic Streaming, and HTTP Live Streaming encoding formats.

* * * * *